(12) United States Patent
Sugimori et al.

(10) Patent No.: US 10,270,086 B2
(45) Date of Patent: Apr. 23, 2019

(54) NONAQUEOUS-ELECTROLYTE SECONDARY-BATTERY NEGATIVE ELECTRODE

(71) Applicant: Sanyo Electric Co., Ltd., Daito-shi, Osaka (JP)

(72) Inventors: Masanori Sugimori, Hyogo (JP); Katsunori Yanagida, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 87 days.

(21) Appl. No.: 15/113,911

(22) PCT Filed: Jan. 20, 2015

(86) PCT No.: PCT/JP2015/000207
§ 371 (c)(1),
(2) Date: Jul. 25, 2016

(87) PCT Pub. No.: WO2015/115051
PCT Pub. Date: Aug. 6, 2015

(65) Prior Publication Data
US 2016/0351892 A1    Dec. 1, 2016

(30) Foreign Application Priority Data

Jan. 31, 2014 (JP) .................................. 2014-016552

(51) Int. Cl.
*H01M 4/36* (2006.01)
*H01M 4/38* (2006.01)
(Continued)

(52) U.S. Cl.
CPC ........... *H01M 4/364* (2013.01); *H01M 4/134* (2013.01); *H01M 4/366* (2013.01); *H01M 4/386* (2013.01);
(Continued)

(58) Field of Classification Search
None
See application file for complete search history.

(56) References Cited

U.S. PATENT DOCUMENTS

2008/0318133 A1   12/2008   Matsuyama et al.
2014/0004415 A1   1/2014    Sawa et al.
(Continued)

FOREIGN PATENT DOCUMENTS

JP   9-147834 A     6/1997
JP   2000-12091 A   1/2000
(Continued)

OTHER PUBLICATIONS

International Search Report dated Apr. 21, 2015, issued in counterpart International Application No. PCT/JP2015/000207 (2 pages).

*Primary Examiner* — Sin J Lee
(74) *Attorney, Agent, or Firm* — Westerman, Hattori, Daniels & Adrian, LLP

(57) ABSTRACT

A negative electrode for nonaqueous electrolyte secondary batteries which suppresses generation of gas and increases power characteristics, including a negative electrode current collector and a negative electrode mixture layer placed on the negative electrode current collector. The negative electrode mixture layer is a mixture of a negative electrode active material, a binding agent, and a conductive agent. The negative electrode active material contains silicon. The binding agent includes a binding agent A made of a rubber polymeric compound. A through-thickness cross section of the negative electrode mixture layer halved into a current collector-side region and a surface-side region, has the amount of the binding agent A in the current collector-side region larger than the amount of the binding agent A in the surface-side region and the amount of the conductive agent (Continued)

in the surface-side region is larger than the amount of the conductive agent in the current collector-side region.

9 Claims, 1 Drawing Sheet

(51) Int. Cl.
    *H01M 4/62*         (2006.01)
    *H01M 4/134*       (2010.01)
    *H01M 4/48*         (2010.01)
    *H01M 4/485*       (2010.01)
    *H01M 10/0525*    (2010.01)
    *H01M 4/02*         (2006.01)

(52) U.S. Cl.
    CPC ........... *H01M 4/483* (2013.01); *H01M 4/485* (2013.01); *H01M 4/622* (2013.01); *H01M 4/625* (2013.01); *H01M 10/0525* (2013.01); *H01M 2004/027* (2013.01); *H01M 2220/30* (2013.01)

(56) References Cited

U.S. PATENT DOCUMENTS

2014/0127576 A1*  5/2014  Kato .................... H01M 4/131
                                                               429/213
2014/0295248 A1* 10/2014  Hotta .................... H01M 4/13
                                                               429/156
2016/0329557 A1* 11/2016  Sugimori .............. H01M 4/366

FOREIGN PATENT DOCUMENTS

| JP | 2007-165108 A | 6/2007 |
|---|---|---|
| JP | 2008-210618 A | 9/2008 |
| JP | 2009-4181 A | 1/2009 |
| JP | 2014-120330 A | 6/2014 |
| WO | 2012/132958 A1 | 10/2012 |
| WO | WO 2013/018486 A1 * | 2/2013 |

* cited by examiner

NONAQUEOUS-ELECTROLYTE SECONDARY-BATTERY NEGATIVE ELECTRODE

TECHNICAL FIELD

The present invention relates to a negative electrode for nonaqueous electrolyte secondary batteries.

BACKGROUND ART

In recent years, smaller and lighter mobile data terminals such as mobile phones, notebook personal computers, and smartphones have been increasingly used and batteries used as driving power supplies therefor have been required to have higher capacity. Nonaqueous electrolyte secondary batteries, which are charged and discharged in such a manner that lithium ions move between positive and negative electrodes in association with charge and discharge, have high energy density and high capacity and therefore are widely used as driving power supplies for the above mobile data terminals.

Furthermore, the nonaqueous electrolyte secondary batteries are recently attracting attention as utility power supplies for electric tools, electric vehicles, and the like and applications thereof are expected to be further expanded. In such a field, high capacity and excellent power characteristics are required.

The use of, for example, a silicon-containing material as a negative electrode active material for the nonaqueous electrolyte secondary batteries is under investigation. For example, Patent Literature 1 below discloses a negative electrode active material composed of cores containing a compound (where the atomic ratio x of O to the total of Si and Sn is given by 0.5≤x≤1.5) containing Si or Sn and O as constituent elements and carbon cover layers covering the surfaces of the cores. It is suggested that a negative electrode can be formed by applying a negative electrode mix paste obtained by kneading a solvent and a mixture containing the negative electrode active material, a binder (binding agent), and the like to a current collector and a conductive aid may be further added to the mixture.

However, in the case of using a silicon-containing material as an active material, although high capacity is expected, there is a problem that the capacity is reduced because the active material significantly expands and contracts in association with the storage and release of lithium ions during charge and discharge and therefore the adhesion between an active material layer and a current collector is reduced by the pulverization of the active material. In order to improve the adhesion between an active material layer and a current collector, Patent Literature 2 below proposes that the active material layer is configured such that the amount of a binding agent decreases from the interface between the active material layer and the current collector toward the outside.

CITATION LIST

Patent Literature

PTL 1: Japanese Published Unexamined Patent Application No. 2008-210618
PTL 2: Japanese Published Unexamined Patent Application No. 9-147834

SUMMARY OF INVENTION

Technical Problem

However, even if a technique disclosed in Patent Literature 2 is applied to Patent Literature 1, there is a problem in that power characteristics are reduced because the surface of an active material is exposed on an electrode surface side on which the amount of a binding agent is small and therefore a side reaction between the active material and an electrolyte solution occurs to generate gas, though the adhesion between an active material layer and a current collector is increased.

Solution to Problem

In order to solve the above problem, a negative electrode for nonaqueous electrolyte secondary batteries according to an aspect of the present invention includes a negative electrode current collector and a negative electrode mixture layer placed on the negative electrode current collector. The negative electrode mixture layer is a layer of a mixture of a negative electrode active material, a binding agent, and a conductive agent. The negative electrode active material contains silicon. The binding agent includes a binding agent A made of a rubber polymeric compound. In the case where a through-thickness cross section of the negative electrode mixture layer is halved into a current collector-side region and a surface-side region, the amount of the binding agent A in the current collector-side region is larger than the amount of the binding agent A in the surface-side region and the amount of the conductive agent in the surface-side region is larger than the amount of the conductive agent in the current collector-side region.

Advantageous Effects of Invention

According to an aspect of the present invention, the following electrode can be provided: a negative electrode for nonaqueous electrolyte secondary batteries in which the adhesion between a negative electrode mixture layer and a current collector is ensured, in which the generation of gas is suppressed, and which have excellent power characteristics.

DESCRIPTION OF EMBODIMENTS

Figure 1:
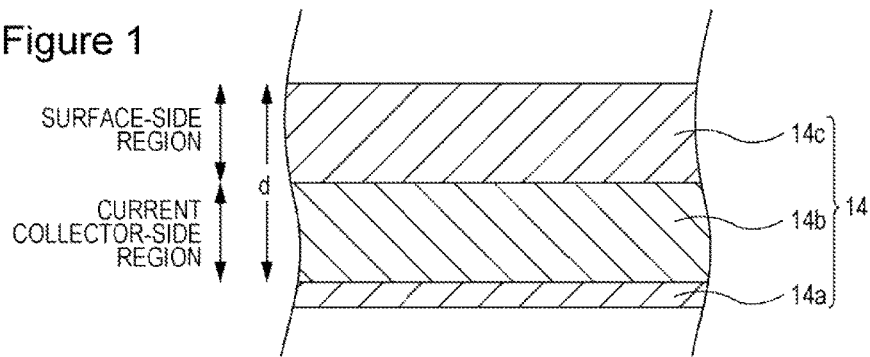
FIG. 1 is an enlarged schematic sectional view of a portion of a negative electrode which is an example of an embodiment of the present invention.

Embodiments of the present invention are described below. The embodiments are examples for carrying out the present invention. The present invention is not limited to the embodiments. Appropriate modifications can be made without departing from the scope of the present invention. Drawings referenced in the descriptions of the embodiments are schematic. Dimensions of components illustrated in the drawings are different from those of actual components in some cases.

A nonaqueous electrolyte secondary battery using a negative electrode which is an example of an embodiment of the present invention includes a positive electrode, the negative electrode, and a nonaqueous electrolyte. A separator is preferably placed between the positive electrode and the negative electrode. An example of the nonaqueous electrolyte secondary battery is, but is not limited to, a configuration in which, for example, an electrode assembly including a positive electrode and negative electrode wound or stacked with a separator therebetween and a nonaqueous electrolyte solution that is a liquid nonaqueous electrolyte are housed in a battery enclosure can. Components of the nonaqueous electrolyte secondary battery, which is an example of this embodiment, are described below.

[Negative Electrode]

The negative electrode, which is an example of this embodiment, includes a negative electrode current collector and negative electrode mixture layers placed on the negative electrode current collector. The negative electrode mixture layers are layers of a mixture of a negative electrode active material, a binding agent, and a conductive agent. The negative electrode active material contains silicon. The binding agent includes a binding agent A made of a rubber polymeric compound. In the case where a through-thickness cross section of each negative electrode mixture layer is halved into a current collector-side region and a surface-side region, the amount of the binding agent A in the current collector-side region is larger than the amount of the binding agent A in the surface-side region and the amount of the conductive agent in the surface-side region is larger than the amount of the conductive agent in the current collector-side region. The binding agent preferably further includes a binding agent B made of a water-soluble polymeric compound. The binding agent B is preferably present in the vicinity of the negative electrode active material. In the negative electrode, which is an example of this embodiment, a larger amount of the binding agent A is placed in the current collector-side region rather than the surface-side region and a larger amount of the conductive agent is placed in the surface-side region rather than the current collector-side region. Therefore, a negative electrode for nonaqueous electrolyte secondary batteries having excellent power characteristics is provided by forming a good-quality SEI (solid electrolyte interface) coating on an electrode surface side.

When a large amount of the binding agent A is placed on a current collector side for the purpose of improving the adhesion between the negative electrode mixture layer and the current collector, the surface of the negative electrode active material is exposed on the electrode surface side, on which the amount of the binding agent A is small, and therefore a side reaction between the active material and an electrolyte solution occurs. This probably generates gas to reduce power characteristics.

However, according to the configuration of the negative electrode, a larger amount of the conductive agent is placed on the surface side and therefore the electrical conductivity on the electrode surface side increases. Since a larger amount of the conductive agent is placed on the surface side, the permeability of the electrolyte solution on the surface side increases and therefore the retentivity of the electrolyte solution on the surface side increases even in such a state that the amount of cavities is significantly reduced by the expansion of the negative electrode active material during charge. Therefore, the electrical conductivity (the migration of electrons) and the retentivity of the electrolyte solution (the diffusion of lithium ions) can be increased on the electrode surface side, on which the charge/discharge reaction of the negative electrode active material is likely to be inhomogeneous because of the expansion of the negative electrode active material during charge and a good-quality SEI coating which is dense and which has excellent lithium ion permeability is probably formed on the surface of the negative electrode active material. Since a smaller amount of the binding agent A and a larger amount of the conductive agent are placed on the surface side, the formation of a SEI coating, which is likely to be locally nonuniform, on the electrode surface side is probably substantially uniform.

That is, according to the above configuration, a good-quality coating which is dense and which has excellent lithium ion permeability is formed on the surface of the negative electrode active material. Therefore, in the case where the negative electrode active material used is a silicon-containing material which significantly expands and contracts during charge and discharge, even if the surface of the negative electrode active material present on the electrode surface side is exposed, the presence of the good-quality coating suppresses the side reaction between the negative electrode active material and the electrolyte solution, the generation of gas by the side reaction can be suppressed, and power characteristics can be probably enhanced.

In the above configuration, when the amount of the conductive agent placed in the surface-side region is the same as the amount of the conductive agent placed in the current collector side and the amount of the binding agent A placed in the current collector-side region is the same as the mount of the binding agent A placed in the surface side, the binding agent A covers the surface of the negative electrode active material, which contains silicon, and therefore the side reaction between the negative electrode active material, which contains silicon that is a cause of the generation of gas, and the electrolyte solution is unlikely to occur. Since the binding agent A covers the surface of the negative electrode active material, which contains silicon, the good-quality SEI coating is not formed and the effect of suppressing the generation of gas is not probably obtained.

As shown in FIG. 1, the negative electrode 14 is preferably composed of, for example, the negative electrode current collector 14a, first negative electrode mixture sub layers 14b placed on the negative electrode current collector, and second negative electrode mixture sub layers 14c each placed on a corresponding one of the first negative electrode mixture sub layers. In this embodiment, the negative electrode mixture layer is composed of two sub-layers as described above. The negative electrode mixture layer may be composed of a plurality of sub-layers.

The expression "a through-thickness cross section of each negative electrode mixture layer is halved into a current collector-side region and a surface-side region" means that when a direction in which the negative electrode current collector 14a and the negative electrode mixture layer (the first negative electrode mixture sub layer 14b and the second negative electrode mixture sub layer 14c) are stacked is defined as a thickness direction of the negative electrode mixture layer, the through-thickness cross section of the negative electrode mixture layer is halved at an intermediate point in the thickness d of the negative electrode mixture layer. In the halved through-thickness cross section, a cross section of the mixture layer that is located close to the current collector is defined as the current collector-side region and a cross section of the mixture layer that is located far away from the current collector is defined as the surface-side region.

A specific method by which the amount of the binding agent A in the current collector-side region is adjusted above the amount of the binding agent A in the surface-side region and the amount of the conductive agent in the surface-side region is adjusted above the amount of the conductive agent in the current collector-side region is described below. For example, current collector-side negative electrode mixture slurry is prepared by mixing the negative electrode active material, a larger amount of the binding agent A than that on the surface side, the same amount of the binding agent B as that on the surface side, a smaller amount of the conductive agent than that on the surface side, and a solvent such as water together. Separately, surface-side negative electrode mixture slurry is prepared by mixing the negative electrode active material, a smaller amount of the binding agent A than that on the current collector side, the same amount of the binding agent B as that on the current collector side, a larger amount of the conductive agent than that on the current collector side, and a solvent such as water together. The current collector-side negative electrode mixture slurry is applied to both surfaces of the negative electrode current collector and is then dried. Thereafter, the surface-side negative electrode mixture slurry is applied to layers of the current collector-side negative electrode mixture slurry and is then dried, whereby the negative electrode mixture layers can be formed. Incidentally, the amount of the binding agent B on the surface side may be different from the amount of the binding agent B on the current collector side.

In the above method, after the current collector-side negative electrode mixture slurry is applied and is then dried, the surface-side negative electrode mixture slurry is applied. The following method may be used: a method in which after the current collector-side negative electrode mixture slurry is applied, the surface-side negative electrode mixture slurry is applied before the current collector-side negative electrode mixture slurry is dried out. In the case of using the latter method, the following layer is likely to be formed: a mixture layer in which the current collector-side negative electrode mixture slurry and the surface-side negative electrode mixture slurry are mixed with each other. In the former method, the amounts of the binding agents A and B vary discontinuously. However, in the latter method, the amounts of the binding agents A and B vary continuously.

The negative electrode active material is not particularly limited and may be one capable of reversibly storing and releasing lithium. The negative electrode active material used may be, for example, a carbon material, a metal alloying with lithium, an alloy material alloying with lithium, a metal oxide, and/or the like. These materials may be used alone or in combination. The negative electrode active material contains at least silicon.

When the negative electrode active material contains silicon, higher capacity can be achieved as compared to when the negative electrode active material used is the carbon material only. When the negative electrode active material contains silicon, the change in volume of the negative electrode active material during charge and discharge is larger as compared to when the negative electrode active material used is the carbon material only. Therefore, the surface of the negative electrode active material is likely to be exposed on the electrode surface side. Furthermore, fresh surfaces are likely to be exposed by the pulverization of particles of the active material and therefore gas is likely to be generated by the side reaction between the active material and an electrolyte solution. Thus, the effect of suppressing the generation of gas by forming the good-quality SEI coating on the surface of the negative electrode active material on the electrode surface side is probably an effect exhibited particularly when the negative electrode active material contains silicon.

According to investigations made by the inventor, it is clear that whether the conductive agent is added and the placement of the conductive agent have little influence on the change in resistance due to the negative electrode when the negative electrode active material used is the carbon material only.

The negative electrode active material preferably contains a silicon-containing material. The silicon-containing material is, for example, at least one selected from the group consisting of silicon particles, silicon alloy particles, and silicon compound particles.

Examples of a silicon alloy include solid solutions of silicon and one or more other elements, intermetallic compounds of silicon and one or more other elements, and eutectic alloys of silicon and one or more other elements. Examples of a method for synthesizing an alloy include an arc melting method, a liquid quenching method, a mechanical alloying method, a sputtering method, a chemical vapor deposition method, and a calcination method. In particular, examples of the liquid quenching method include various atomizing methods such as a single-roll quenching method, a twin-roll quenching method, a gas atomizing method, a water atomizing method, and a disk atomizing method.

The silicon compound particles are not particularly limited and may be a compound containing silicon. The silicon compound particles are preferably a compound containing silicon and oxygen. Such a compound is a silicon oxide (the atomic ratio x of oxygen to the total amount of silicon is given by $0.5 \leq x \leq 1.5$).

The silicon oxide is preferably surface-coated with amorphous carbon. The silicon oxide has high electronic resistance and therefore reduces load characteristics. Surface-coating the silicon oxide with amorphous carbon enables electronic conductivity to be imparted to the silicon oxide, thereby enabling the electrical conductivity of a mixture layer to be increased.

The negative electrode active material preferably further contains a carbon material. The carbon material is not particularly limited and may be one capable of reversibly storing and releasing lithium. Graphite including natural graphite, non-graphitizable carbon, and artificial graphite can be used. In this case, the content of the silicon-containing material present in each negative electrode mixture layer is preferably 1% to 50% by mass and more preferably 1% to 20% by mass with respect to the total amount (the sum of the amount of the carbon material and the amount of the silicon-containing material) of the negative electrode active material present in the negative electrode mixture. This is because when the content of the silicon-containing material is more than 50% by mass, the influence of the expansion and contraction of the silicon-containing material is too large and because when the content of the silicon-containing material is less than 1% by mass, the effect of increasing the capacity of a battery is unlikely to be obtained.

A larger amount of the silicon-containing material, as well as the conductive agent, is preferably placed in the surface-side region rather than the current collector-side region. For example, the content of silicon present in the surface-side region is 50% to 100% by mass with respect to the amount of silicon present in the negative electrode mixture. This is because since the surface-side region has sufficient electrical conductivity and lithium ion conductivity due to an effect obtained by placing a large amount of the conductive agent, most of the negative electrode active material, which contains silicon, is likely to be covered with a good-quality coating and therefore the generation of gas by a side reaction can be reduced.

The conductive agent used may be, for example, a carbonaceous conductive agent. Examples of the carbonaceous conductive agent include carbon blacks such as furnace black, acetylene black, and Ketjenblack and graphite. The conductive agent preferably has an average particle size of 0.0001 μm to 30 μm, more preferably 0.001 μm to 10 μm, and particularly preferably 0.01 μm to 1 μm. This is because when the average particle size is too large, the diffusion of lithium ions is likely to be inhibited and an effect of this configuration is unlikely to be obtained and because when the average particle size is too small, oil absorption increases due to an increase in specific surface area, the amount of solid matter in mixture slurry is unlikely to be increased, and therefore a problem that productivity is poor is likely to occur.

The conductive agent used may be fibrous carbon including carbon fibers and carbon nanotubes in addition to those described above.

The content of the conductive agent in the negative electrode mixture layer is preferably 0.1% to 20% by mass and more preferably 0.1% to 6% by mass from the viewpoint of high capacity. This is because when the content of the conductive agent less than 0.1% by mass, the effect of increasing the electronic conductivity and lithium ion diffusivity on the electrode surface side is not sufficiently obtained and because when the content of the conductive agent more than 20% by mass, a problem with a reduction in battery capacity occurs.

The binding agent A, which contains the rubber polymeric compound, is not particularly limited and may be an elastic polymeric compound. Examples of the binding agent A include rubber binders such as styrene-butadiene rubber, high styrene rubber, ethylene-propylene rubber, butyl rubber, chloroprene rubber, butadiene rubber, isoprene rubber, acrylonitrile-butadiene rubber, acrylonitrile rubber, fluororubber, acrylic rubber, and silicone rubber. The rubber binders may be used alone or in combination.

The percentage of the binding agent A in the negative electrode mixture layer is preferably 0.5% to 2% by mass. The amount of the binding agent A present in the current collector-side region is preferably 50% to 70% of the amount of the binding agent A present in the negative electrode mixture layer. This is because when the amount of the binding agent A on the current collector side is large, there is an excellent effect that adhesion properties and the performance of holding the electrolyte solution are enhanced and because when the amount of the binding agent A on the surface side is too small, lithium ions are likely to migrate during rest and therefore a problem that self-discharge proceeds is likely to occur.

The binding agent A has a property that the binding agent rises into the surface-side region of the electrode together with a solvent in the course of drying negative electrode mixture slurry and is unevenly distributed in the surface-side region after drying. The amount of the binding agent A in the current collector-side region after drying can be adjusted within the above range in such a manner that a larger amount of the binding agent A is charged in the current collector-side region in advance.

A method for determining the binding agent A is a method in which a cross section is prepared with a cross section polisher, is dyed with osmium tetroxide, and is then analyzed with an electron probe microanalyzer (abbreviated as EPMA) or an energy dispersive X-ray spectroscopy (abbreviated as EDX or EDS) or a similar method.

The binding agent B, which contains the water-soluble polymeric compound, is not particularly limited and may be a polymeric compound which is water-soluble. Polymer-based water-soluble polymeric compounds (hereinafter referred to as the "polymer-based compounds") and polysaccharide-based water-soluble polymeric compounds (hereinafter referred to as the "polysaccharide-based compounds") may be used alone or in combination. The polymer-based compounds used may be polyvinyl alcohol, polyvinylpyrrolidone, polyethylene oxide, and derivatives thereof. The polysaccharide-based compounds used may be cellulose, carboxymethylcellulose, and the like. In particular, carboxymethylcellulose is preferable from the viewpoint of electrochemical stability and the like. The percentage of the binding agent B in the negative electrode mixture layer is preferably 0.5% to 2% by mass.

In order to ensure the adhesion of the negative electrode active material in the negative electrode mixture layer and in order to form a good-quality SEI (solid electrolyte interface) coating, the binding agent B is preferably present in the vicinity of the negative electrode active material.

The negative electrode mixture slurry used may be aqueous negative electrode mixture slurry prepared by mixing a binding agent such as styrene-butadiene rubber with a solvent such as water or nonaqueous negative electrode mixture slurry prepared by mixing a binding agent such as PVdF with a nonaqueous solvent. In the case where an active material, such as the silicon-containing material, expanding and contracting significantly is mixed, the aqueous negative electrode mixture slurry is preferably used because a large amount of the binding agent needs to be added in order to ensure current collection properties and therefore high capacity is unlikely to be achieved using the nonaqueous negative electrode mixture slurry.

[Positive Electrode]

The positive electrode is not particularly limited and may be one capable of being used as a positive electrode for nonaqueous electrolyte secondary batteries. A positive electrode active material is a lithium-transition metal composite oxide containing a transition metal such as cobalt, nickel, manganese, or aluminium or a similar oxide. Examples of a lithium transition metal composite oxide containing nickel and manganese include lithium-nickel composite oxides, lithium-nickel-cobalt composite oxides, lithium-nickel-cobalt-aluminium composite oxides, and lithium-nickel-cobalt-manganese composite oxides.

The type of the lithium-transition metal composite oxide is not limited to those described above. The lithium-transition metal composite oxide may be one, having an olivine structure, represented by the formula $LiMePO_4$ (where Me is at least one selected from the group consisting of Fe, Ni, Co, and Mn); one, having a spinel structure, represented by the formula $LiMe_2O_4$ (where Me is at least one selected from the group consisting of Fe, Ni, Co, and Mn); or the like. The lithium-transition metal composite oxide may further contain at least one selected from the group consisting of magnesium, aluminium, titanium, chromium, vanadium, iron, copper, zinc, niobium, molybdenum, zirconium, tin, tungsten, sodium, and potassium.

[Nonaqueous Electrolyte]

A solvent for the negative electrode is not particularly limited and may be one conventionally used in nonaqueous electrolyte secondary batteries. For example, the following compounds can be used: cyclic carbonates such as ethylene carbonate, propylene carbonate, butylene carbonate, and vinylene carbonate; linear carbonates such as dimethyl carbonate, ethyl methyl carbonate, and diethyl carbonate; compounds including esters such as methyl acetate, ethyl acetate, propyl acetate, methyl propionate, ethyl propionate, and γ-butyrolactone; sulfo group-containing compounds such as propanesultone; compounds including ethers such as 1,2-dimethoxyethane, 1,2-diethoxyethane, tetrahydrofuran, 1,2-dioxane, 1,4-dioxane, and 2-methyltetrahydrofuran; compounds including nitriles such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and compounds including amides such as dimethylformamide. In particular, solvents obtained by partly substituting H in these compounds with F are preferably used. These compounds may be used alone or in combination. The following solvents are particularly preferable: a solvent which is a combination of a cyclic carbonate and a linear carbonate and a solvent which is a combination of these cyclic and linear carbonates, small amounts of compounds including nitriles, and small amounts of compounds including ethers.

An ionic liquid can be used as a nonaqueous solvent for the nonaqueous electrolyte. In this case, a cationic species and an anionic species are not particularly limited. A combination of a cation such as a pyridinium cation, an imidazolium cation, or a quaternary ammonium cation and an anion such as a fluorine-containing imide anion is particularly preferable from the viewpoint of low viscosity, electrochemical stability, hydrophobicity, and the like.

Furthermore, a known lithium salt conventionally used in nonaqueous electrolyte secondary batteries can be used as a solute for the nonaqueous electrolyte. The lithium salt used may be one containing at least one selected from the group consisting of P, B, F, O, S, N, and Cl. In particular, the following slats and mixtures can be used: lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_2SO_2)_3$, $LiAsF_6$, and $LiClO_4$ and mixtures of these salts. In particular, $LiPF_6$ is preferably used in order to enhance the durability and high-rate charge/discharge characteristics of the nonaqueous electrolyte secondary battery.

[Others]

A separator used may be one conventionally used. In particular, a separator containing polyethylene, a separator including a polypropylene-containing layer formed on polyethylene, or a polyethylene separator surface-coated with an aramid resin or the like may be used.

Layers containing inorganic filler conventionally used may be formed between the positive electrode and the separator and between the negative electrode and the separator. The filler used may be an oxide, containing one or some of titanium, aluminium, silicon, and magnesium, conventionally used; a phosphoric acid compound, containing one or some of titanium, aluminium, silicon, and magnesium, conventionally used; or one surface-treated with a hydroxide or the like. The filler layers can be formed in such a manner that filler-containing slurry is directly applied to the positive electrode, the negative electrode, or the separator; in such a manner that a sheet formed from the filler is attached to the positive electrode, the negative electrode, or the separator; or in a similar manner.

EXAMPLES

Examples of the present invention are described below in detail with reference to experiment examples. The present invention is not limited to the experiment examples. Appropriate modifications can be made without departing from the scope of the present invention.

Experiment Examples

Experiment Example 1

[Preparation of Negative Electrode]

The following materials were mixed together: as a negative electrode active material, 95 parts by mass of a graphite powder, 5 parts by mass of $SiO_x$ (x=1) having a carbon coating layer, 1 part by mass of carboxymethylcellulose (CMC) corresponding to a binding agent B, and water. The mixture was mixed with 1.5 parts by mass of styrene-butadiene rubber (SBR) corresponding to a binding agent A and water, whereby negative electrode mixture slurry (1) was prepared. That is, the mass ratio of the negative electrode active material to CMC to SBR was 100:1:1.5.

Furthermore, the following materials were mixed together: 95 parts by mass of the graphite powder, 5 parts by mass of $SiO_x$ (x=1) having a carbon coating layer, 1 part by mass of carboxymethylcellulose (CMC) corresponding to the binding agent B, and water. The mixture was mixed with 0.5 parts by mass of styrene-butadiene rubber (SBR) corresponding to the binding agent A and water, whereby negative electrode mixture slurry (2) was prepared. That is, the mass ratio of the negative electrode active material to CMC to SBR was 100:1:0.5.

Next, as shown in FIG. 1, the negative electrode mixture slurry (1) was applied to both surfaces of a negative electrode current collector 14a (refer to FIG. 1) made of copper foil with a thickness of 8 μm and was dried, whereby first negative electrode mixture sub layers 14b were formed. Thereafter, the negative electrode mixture slurry (2) was applied to both surfaces of layers of the negative electrode mixture slurry (1) and was dried, whereby second negative electrode mixture sub layers 14c were formed.

In this operation, the mass of the negative electrode active material contained in the layers of the negative electrode mixture slurry (1) was the same as the mass of the negative electrode active material contained in layers of the negative electrode mixture slurry (2). The amount of a mix applied to both surfaces was 282 g/m² in total.

Rolling was performed using a rolling roller such that the thickness of an electrode plate was 175 μm and a predetermined electrode size was cut out, whereby a negative electrode was prepared.

[Preparation of Positive Electrode]

With 100 parts by mass of particles of lithium nickel cobalt aluminium oxide represented by $LiNi_{0.82}Co_{0.15}Al_{0.03}O_2$, 0.8 parts by mass of carbon black serving as a carbon conductive agent and 0.7 parts by mass of polyvinylidene fluoride serving as a binding agent were mixed, followed by adding an appropriate amount of NMP (N-methyl-2-pyrrolidone), whereby positive electrode mixture slurry was prepared. Next, the positive electrode mixture slurry was applied to both surfaces of a positive electrode current collector, containing aluminium, having a thickness of 15 μm and was dried. The amount of a mix applied to both surfaces was 578 g/m² in total. Rolling was performed using a roller such that the thickness of an electrode plate was 164 m and a predetermined electrode size was cut out, whereby a positive electrode was prepared.

[Preparation of Electrode Assembly]

The single positive electrode, the single negative electrode, and two separators including a microporous membrane made of polyethylene were used to prepare a flat wound electrode assembly. First, the positive electrode and the negative electrode were placed opposite each other in such a state that the positive electrode and the negative electrode were insulated from each other with the separators. Next, the positive electrode, the negative electrode, and the separators were spirally wound around a cylindrical winding core. In this operation, a positive electrode current-collecting tab and a negative electrode current-collecting tab were arranged so as to be located at the outermost edge of each electrode. Thereafter, a wound electrode assembly was prepared by drawing out the winding core and was then crushed, whereby the flat wound electrode assembly was obtained. The flat wound electrode assembly has a structure in which the positive electrode and the negative electrode are stacked with the separators therebetween.

[Preparation of Nonaqueous Electrolyte Solution]

To a solvent mixture of EC (ethylene carbonate), DMC (dimethyl carbonate), and EMC (ethyl methyl carbonate) mixed at a volume ratio of 20:60:20, 3% by mass of VC (vinylene carbonate) was added, followed by dissolving 1.3 moles per liter of $LiPF_6$ serving as a solute, whereby a nonaqueous electrolyte solution was prepared.

[Preparation of Battery]

Figure 2:
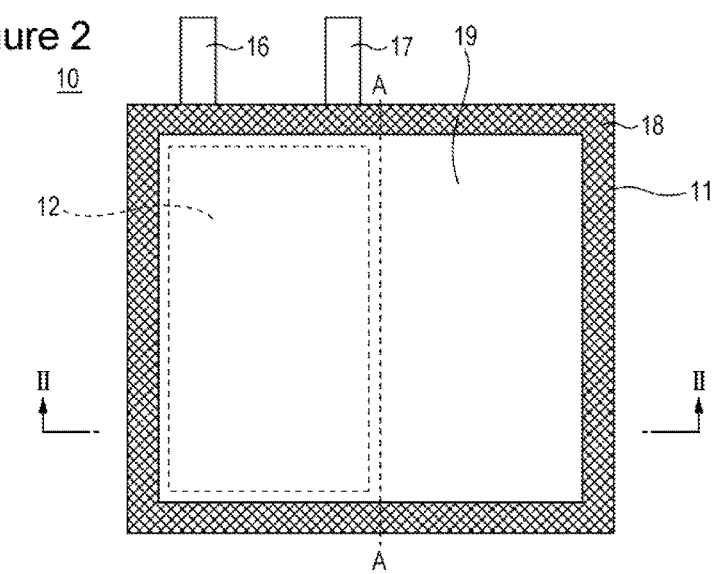
FIG. 2 is a schematic plan view of a nonaqueous electrolyte secondary battery which is an example of an embodiment of the present invention.
Figure 3:
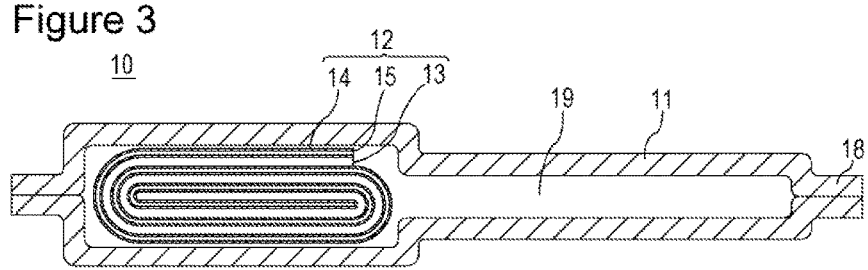
FIG. 3 is a schematic sectional view showing a cross section taken along the line II-II of FIG. 1.

The nonaqueous electrolyte solution prepared as described above and the flat wound electrode assembly were provided in a laminate enclosure 11, made of aluminium, having a thickness d of 3.6 mm, a width of 3.5 cm, and a length of 6.2 cm in a glove box under an argon atmosphere, whereby a laminate-type nonaqueous electrolyte secondary battery 10 having a structure shown in FIGS. 2 and 3 was prepared. A nonaqueous electrolyte secondary battery according to Experiment Example 1 had a design capacity of 1,250 mAh as determined by charging the battery to a voltage of 4.2 V. The battery prepared as described above is hereinafter referred to as Battery A1.

The structure of the nonaqueous electrolyte secondary battery 10, which was prepared in Experiment Example 1, is described with reference to FIGS. 2 and 3. The nonaqueous electrolyte secondary battery 10 includes the laminate enclosure 11 covering the periphery, the flat wound electrode assembly 12, and the nonaqueous electrolyte solution. The wound electrode assembly 12 is flat and has a configuration in which the positive electrode 13 and the negative electrode 14 are wound in such a state that the positive electrode 13 and the negative electrode 14 are insulated from each other with the separators 15. The positive electrode current-collecting tab 16 is connected to the positive electrode 13 of the wound electrode assembly 12. Likewise, the negative electrode current-collecting tab 17 is connected to the negative electrode 14. The wound electrode assembly 12 is sealed in the laminate enclosure 11, which covers the periphery, together with the nonaqueous electrolyte solution. An outer peripheral portion of the laminate enclosure 11 is hermetically sealed with a heat seal portion 18.

In the nonaqueous electrolyte secondary battery 10, which was prepared in Experiment Example 1, an extending portion 19 of the laminate enclosure 11 remains, the extending portion 19 being formed on one side of the wound electrode assembly 12 for the purpose of readily pouring the nonaqueous electrolyte solution. The extending portion 19 is used to analyze gas components produced during charge and discharge, components formed in the nonaqueous electrolyte solution, or the like. In order to obtain a product nonaqueous electrolyte secondary battery, a position along the line A-A in FIG. 2 may be heat-sealed.

Experiment Example 2

A nonaqueous electrolyte secondary battery was prepared in substantially the same manner as that described in Experiment Example 1 except that when negative electrode mixture slurry (2) was prepared, 95 parts by mass of the graphite powder, 5 parts by mass of $SiO_x$ (x=1) having the carbon coating layer, 1 part by mass of carboxymethylcellulose (CMC) corresponding to the binding agent B, water, and 2 parts by mass of carbon black serving as a conductive agent were mixed together and the mixture was mixed with 0.5 parts by mass of styrene-butadiene rubber (SBR) corresponding to the binding agent A and water. The battery prepared as described above is hereinafter referred to as Battery A2.

Experiment Example 3

When negative electrode mixture slurry (1) was prepared, 95 parts by mass of a graphite powder, 5 parts by mass of $SiO_x$ (x=1) having a carbon coating layer, 1 part by mass of carboxymethylcellulose (CMC) corresponding to a binding agent B, water, and 1 part by mass of carbon black serving as a conductive agent were mixed together. The mixture was mixed with 1.5 parts by mass of styrene-butadiene rubber (SBR) corresponding to a binding agent A and water.

When negative electrode mixture slurry (2) was prepared, 95 parts by mass of the graphite powder, 5 parts by mass of $SiO_x$ (x=1) having the carbon coating layer, 1 part by mass of carboxymethylcellulose (CMC) corresponding to the binding agent B, water, and 1 part by mass of carbon black serving as a conductive agent were mixed together. The mixture was mixed with 0.5 parts by mass of styrene-butadiene rubber (SBR) corresponding to the binding agent A and water.

A nonaqueous electrolyte secondary battery was prepared in substantially the same manner as that described in Experiment Example 1 except that the negative electrode mixture slurry (1) and the negative electrode mixture slurry (2) were used. The battery prepared as described above is hereinafter referred to as Battery A3.

Experiment Example 4

A nonaqueous electrolyte secondary battery was prepared in substantially the same manner as that described in Experiment Example 1 except that when negative electrode mixture slurry (1) was prepared, 95 parts by mass of the graphite powder, 5 parts by mass of $SiO_x$ (x=1) having the carbon coating layer, 1 part by mass of carboxymethylcellulose (CMC) corresponding to the binding agent B, water, and 2 parts by mass of carbon black serving as a conductive agent were mixed together and the mixture was mixed with 1.5 parts by mass of styrene-butadiene rubber (SBR) corresponding to the binding agent A and water. The battery prepared as described above is hereinafter referred to as Battery A4.

Experiment Example 5

When negative electrode mixture slurry (1) was prepared, 97.5 parts by mass of a graphite powder, 2.5 parts by mass of $SiO_x$ (x=1) having a carbon coating layer, 1 part by mass of carboxymethylcellulose (CMC) corresponding to a binding agent B, water, and 1 part by mass of carbon black serving as a conductive agent were mixed together. The mixture was mixed with 1.5 parts by mass of styrene-butadiene rubber (SBR) corresponding to a binding agent A and water.

When negative electrode mixture slurry (2) was prepared, 92.5 parts by mass of the graphite powder, 7.5 parts by mass of $SiO_x$ (x=1) having the carbon coating layer, 1 part by mass of carboxymethylcellulose (CMC) corresponding to the binding agent B, water, and 1 part by mass of carbon black serving as a conductive agent were mixed together. The mixture was mixed with 0.5 parts by mass of styrene-butadiene rubber (SBR) corresponding to the binding agent A and water.

A nonaqueous electrolyte secondary battery was prepared in substantially the same manner as that described in Experiment Example 1 except that the negative electrode mixture slurry (1) and the negative electrode mixture slurry (2) were used. The battery prepared as described above is hereinafter referred to as Battery A5.

Experiment Example 6

When negative electrode mixture slurry (1) was prepared, 97.5 parts by mass of a graphite powder, 2.5 parts by mass of $SiO_x$ (x=1) having a carbon coating layer, 1 part by mass of carboxymethylcellulose (CMC) corresponding to a binding agent B, and water were mixed together. The mixture was mixed with 1.5 parts by mass of styrene-butadiene rubber (SBR) corresponding to a binding agent A and water.

When negative electrode mixture slurry (2) was prepared, 92.5 parts by mass of the graphite powder, 7.5 parts by mass of $SiO_x$ (x=1) having the carbon coating layer, 1 part by mass of carboxymethylcellulose (CMC) corresponding to the binding agent B, water, and 2 parts by mass of carbon black serving as a conductive agent were mixed together. The mixture was mixed with 0.5 parts by mass of styrene-butadiene rubber (SBR) corresponding to the binding agent A and water.

A nonaqueous electrolyte secondary battery was prepared in substantially the same manner as that described in Experiment Example 1 except that the negative electrode mixture slurry (1) and the negative electrode mixture slurry (2) were used. The battery prepared as described above is hereinafter referred to as Battery A6.

(Experiments)
[Abundance Ratio of SBR]

Negative electrode plates of Batteries A1 to A6 were analyzed for condition. In each negative electrode plate, a cross section was prepared with a cross section polisher (manufactured by JEOL Ltd.). The cross section was observed with a scanning electron microscope (SEM), whereby a 500× magnification image was obtained. Next, the cross section was dyed with osmium tetroxide, the content of a binding agent A (SBR) in each of a surface-side region and current collector-side region obtained by halving a negative electrode mixture layer in a thickness direction of the negative electrode mixture layer was determined in the same area using an energy dispersive X-ray spectrometer (abbreviated as EDX or EDS), and the abundance ratio of the binding agent A to the whole of the negative electrode mixture layer was calculated. Results are shown in Table 1.

(Power Characteristic Test)
[Calculation of DCIR]

Batteries A1 to A6 were initially charged and discharged under conditions below.

(Charge and Discharge Conditions)

Initial Charge and Discharge Conditions

Constant-current charge was performed at a current of 0.5 lt (625 mA) until the voltage of each battery reached 4.2 V. Furthermore, constant-voltage charge was performed at a voltage of 4.2 V until the current reached 0.02 it (25 mA). Thereafter, constant-current discharge was performed at a current of 0.5 lt (625 mA) until the battery voltage reached 2.5 V.

Next, charge and discharge were performed under conditions below. The value of the initial direct-current internal resistance (DCIR) given by Equation (1) below was investigated. Results are shown in Table 1.

(Charge and Discharge Conditions)

Constant-current charge was performed at a temperature of 25° C. and a current of 0.3 lt (375 mA) until the voltage of each battery reached 3.79 V. Furthermore, constant-voltage charge was performed at a voltage of 3.79 V until the current reached 0.02 lt (25 mA). After a rest was taken for 2 hours, discharge was performed at a current of 0.2 lt (250 mA) for 10 seconds.

(Equation for Calculating DCIR)

Resistance (mΩ)=(voltage immediately before start of discharge–voltage after 10 seconds from start of discharge)/(discharge current density×electrode area)     (1)

[Calculation of Cell Thickness of Battery]

After being initially charged and discharged, Batteries A1 to A6 were measured for cell thickness. Results are shown in Table 1.

TABLE 1

| Batteries | Amount of mixed silicon-containing material (mass percent) | | Amount of added conductive agent (mass percent) | | Abundance ratio of binding agent A (%) | | DCIR (mΩ) | Cell thickness (mm) |
|---|---|---|---|---|---|---|---|---|
| | Surface side | Current collector side | Surface side | Current collector side | Surface side | Current collector side | | |
| A1 | 5 | 5 | — | — | 39.8 | 60.2 | 88.2 | 4.87 |
| A2 | 5 | 5 | 2 | — | 46.1 | 53.9 | 82.3 | 4.80 |
| A3 | 5 | 5 | 1 | 1 | 38.5 | 61.5 | 83.7 | 4.8 |
| A4 | 5 | 5 | — | 2 | 35.4 | 64.6 | 89.2 | 5.08 |
| A5 | 7.5 | 2.5 | 1 | 1 | 37.6 | 62.4 | 85.4 | 4.82 |
| A6 | 7.5 | 2.5 | 2 | — | 43.3 | 56.7 | 81.4 | 4.71 |

As is clear from Table 1, Batteries A2 and A6, in which the conductive agent was added to the surface side only, have a smaller DCIR and more excellent power characteristics as compared to Battery A1, in which no conductive agent was added, Battery A4, in which the conductive agent was added to the current collector side only, and Batteries A3 and A5, in which an equal amount of the conductive agent was added to the surface side and current collector side. In addition, Batteries A2 and A6 have a smaller cell thickness as compared to Batteries A1 and A3 to A5.

In a comparison between Batteries A2 and A6, in which the conductive agent was added to the surface side only, Battery A6, in which a larger amount of a silicon-containing material was placed on the surface side rather than the current collector side, has a smaller DCIR and a smaller cell thickness as compared to Battery A2, in which an equal amount of the silicon-containing material was placed on the surface side and the current collector side. As is clear from this, a larger amount of the silicon-containing material, as well as the conductive agent, is preferably placed on the surface side rather than the current collector side.

Battery A4, in which the conductive agent was added to the current collector side only, has a significantly larger DCIR and a significantly larger cell thickness as compared to Battery A1, in which no conductive agent was added. Batteries A3 and A5, in which an equal amount of the conductive agent was added to the surface side and current collector side, are insufficient in DCIR and cell thickness as compared to Batteries A2 and A6.

That is, it can be said that the reduction of power characteristics is suppressed in such a manner that a larger amount of the binding agent A is placed on the current collector side rather than the surface side and a larger amount of the conductive agent is placed on the surface side rather than the current collector side. The reason why this result is obtained is unclear and is probably as described below. In Batteries A2 and A6, the amount of the conductive agent on the electrode surface side is large and the amount of the binding agent A on the current collector side is large. It is conceivable that, due to a large amount of the conductive agent placed on the surface side, the electrical conductivity on the electrode surface side and the retentivity of the electrolyte solution are increased and a good-quality SEI coating which is dense and which has excellent lithium ion permeability is formed on the surface of the negative electrode active material on the electrode surface side, on which a reaction is likely to be inhomogeneous because the negative electrode active material expands during charge. It is also conceivable that the formation of the good-quality SEI coating suppresses a side reaction between the negative electrode active material, which contains silicon, and the electrolyte solution to suppress the generation of gas by the side reaction and power characteristics can be enhanced.

In Battery A1, the amount of the binding agent A on the surface side is small, the amount of the binding agent A on the current collector side is large, and no conductive agent is contained. Therefore, in Battery A1, the surface of the negative electrode active material, which contains silicon, is exposed on the electrode surface side and a good-quality SEI coating which is dense and which has excellent lithium ion permeability is not formed on the surface of the negative electrode active material. Hence, it is conceivable that Battery A1 has an increased amount of generated gas and an increased DCIR as compared to Batteries A2 and A6.

In Battery A4, a small amount of the binding agent A is placed on the surface side, a large amount of the binding agent A is placed on the current collector side, and a large amount of the conductive agent is placed on the current collector side. In Battery A4, the surface of the negative electrode active material, which contains silicon, is exposed on the electrode surface side and a good-quality SEI coating which is dense and which has excellent lithium ion permeability is not formed on the surface of the negative electrode active material. Hence, it is conceivable that Battery A4 has an increased amount of generated gas and an increased DCIR as compared to Batteries A2 and A6.

In Batteries A3 and A5, a small amount of the binding agent A is placed on the surface side, a large amount of the binding agent A is placed on the current collector side, and an equal amount of the conductive agent is placed on the surface side and the current collector side. In Batteries A3 and A5, the conductive agent placed on the surface side increases the electrical conductivity and the ionic diffusivity. However, since an equal amount of the conductive agent is placed on the surface side and the current collector side, the retentivity of the electrolyte solution is increased on the current collector side and therefore the retentivity of the electrolyte solution is insufficient on the electrode surface side, on which a reaction is likely to be inhomogeneous because the negative electrode active material expands during charge. Therefore, it is conceivable that a good-quality SEI coating which is dense and which has excellent lithium ion permeability is not formed on the surface of the negative electrode active material.

Reference Experiment Examples

In reference experiment examples, the following difference is described: the difference in gas generation between the case of using a silicon-containing negative electrode active material as a negative electrode active material and the case of using a carbon material only as a negative electrode active material.

Reference Experiment Example 1

[Preparation of Negative Electrode]

The following materials were mixed together: 100 parts by mass of a graphite powder, 1 part by mass of carboxymethylcellulose (CMC) corresponding to a binding agent B, and water. The mixture was mixed with 1 part by mass of styrene-butadiene rubber (SBR) corresponding to a binding agent A and water, whereby negative electrode mixture slurry was prepared.

Next, the negative electrode mixture slurry was applied to both surfaces of a negative electrode current collector made of copper foil with a thickness of 8 μm and was dried, whereby negative electrode mixture layers were formed. In this operation, the amount of a mix applied to both surfaces was 256 g/m² in total. Rolling was performed using a rolling roller such that the thickness of an electrode plate was 154 μm and a predetermined electrode size was cut out, whereby a negative electrode was prepared.

[Preparation of Positive Electrode]

A positive electrode was prepared in substantially the same manner as that described in Experiment Example 1 except that the amount of a mix applied to both surfaces was 468 g/m² in total and rolling was performed such that the thickness of an electrode plate was 135 μm.

[Preparation of Battery]

A nonaqueous electrolyte secondary battery was prepared in substantially the same manner as that described in Experiment Example 1 except that the negative and positive electrodes prepared as described above were used. The battery prepared as described above is hereinafter referred to as Battery B1.

Reference Experiment Example 2

[Preparation of Negative Electrode]

The following materials were mixed together: as a negative electrode active material, 100 parts by mass of a graphite powder, 1 part by mass of carboxymethylcellulose (CMC) corresponding to a binding agent B, and water. The mixture was mixed with 1.5 parts by mass of styrene-butadiene rubber (SBR) corresponding to a binding agent A and water, whereby negative electrode mixture slurry (1) was prepared.

Furthermore, the following materials were mixed together: as a negative electrode active material, 100 parts by mass of the graphite powder, 1 part by mass of carboxymethylcellulose (CMC) corresponding to the binding agent B, and water. The mixture was mixed with 0.5 parts by mass of styrene-butadiene rubber (SBR) corresponding to the binding agent A and water, whereby negative electrode mixture slurry (2) was prepared.

Next, negative electrode mixture layers were formed in substantially the same manner as that described in Experiment Example 1 except that the negative electrode slurry (1) and the negative electrode slurry (2) were used. In this operation, the amount of a mix applied to both surfaces was 256 g/m² in total. Rolling was performed using a rolling roller such that the thickness of an electrode plate was 154 μm and a predetermined electrode size was cut out, whereby a negative electrode was prepared.

[Preparation of Battery]

A nonaqueous electrolyte secondary battery was prepared in substantially the same manner as that described in Reference Example 1 except that the negative electrode prepared as described above was used. The battery prepared as described above is hereinafter referred to as Battery B2.

Reference Experiment Example 3

[Preparation of Negative Electrode]

The following materials were mixed together: as a negative electrode active material, 96 parts by mass of a graphite powder, 4 parts by mass of $SiO_x$ (x=1) having a carbon coating layer, 1 part by mass of carboxymethylcellulose (CMC) corresponding to a binding agent B, and water. The mixture was mixed with 1 part by mass of styrene-butadiene rubber (SBR) corresponding to a binding agent A and water, whereby negative electrode mixture slurry was prepared. That is, the mass ratio of the negative electrode active material to CMC to SBR was 100:1:1.

Next, the negative electrode mixture slurry was applied to both surfaces of a negative electrode current collector made of copper foil with a thickness of 8 μm and was dried, whereby negative electrode mixture layers were formed. In this operation, the amount of a mix applied to both surfaces was 289 g/m² in total. Rolling was performed using a rolling roller such that the thickness of an electrode plate was 176 μm and a predetermined electrode size was cut out, whereby a negative electrode was prepared.

[Preparation of Positive Electrode]

A positive electrode was prepared in substantially the same manner as that described in Reference Example 1 except that the amount of a mix applied to both surfaces was 577 g/m² in total and rolling was performed such that the thickness of an electrode plate was 163 μm.

[Preparation of Battery]

A nonaqueous electrolyte secondary battery was prepared in substantially the same manner as that described in Experiment Example 1 except that the negative and positive electrodes prepared as described above were used. The battery prepared as described above is hereinafter referred to as Battery B3.

Reference Experiment Example 4

The following materials were mixed together: as a negative electrode active material, 96 parts by mass of a graphite powder, 4 parts by mass of $SiO_x$ (x=1) having a carbon coating layer, 1 part by mass of carboxymethylcellulose (CMC) corresponding to a binding agent B, and water. The mixture was mixed with 1.5 parts by mass of styrene-butadiene rubber (SBR) corresponding to a binding agent A and water, whereby negative electrode mixture slurry (1) was prepared. That is, the mass ratio of the negative electrode active material to CMC to SBR was 100:1:1.5.

Furthermore, the following materials were mixed together: as a negative electrode active material, 96 parts by mass of the graphite powder, 4 parts by mass of $SiO_x$ (x=1) having a carbon coating layer, 1 part by mass of carboxymethylcellulose (CMC) corresponding to the binding agent B, and water. The mixture was mixed with 0.5 parts by mass of styrene-butadiene rubber (SBR) corresponding to the binding agent A and water, whereby negative electrode mixture slurry (2) was prepared. That is, the mass ratio of the negative electrode active material to CMC to SBR was 100:1:0.5.

Next, a negative electrode mixture layers were prepared in substantially the same manner as that described in Experiment Example 1 except that the negative electrode slurry (1) and the negative electrode slurry (2) were used. In this operation, the amount of a mix applied to both surfaces was 289 g/m² in total. Rolling was performed such that the thickness of an electrode plate was 176 μm, whereby a negative electrode was prepared.

[Preparation of Battery]

A nonaqueous electrolyte secondary battery was prepared in substantially the same manner as that described in Reference Example 3 except that the negative electrode prepared as described above was used. The battery prepared as described above is hereinafter referred to as Battery B4.

(Experiments)

[Abundance Ratio of SBR]

Negative electrode plates of Batteries B1 to B4, as well as Batteries A1 to A6, were analyzed for condition. The abundance ratio of a binding agent A (SBR) to the whole of a negative electrode mixture layer in each of a surface-side region and a current collector-side region was calculated. Results are shown in Table 2.

(Storage Characteristic Test)

[Measurement of Amount of Gas]

Batteries B1 to B4 were initially charged and discharged under conditions below.

(Charge and Discharge Conditions)

Initial Charge and Discharge Conditions

Constant-current charge was performed at a current of 0.5 lt (400 mA) until the voltage of each battery reached 4.2 V. Furthermore, constant-voltage charge was performed at a voltage of 4.2 V until the current reached 0.02 lt (16 mA). Thereafter, constant-current discharge was performed at a current of 0.5 lt (400 mA) until the battery voltage reached 2.5 V.

Next, after charge and discharge were performed under conditions below, a high-temperature storage test below was performed and the amount of gas accumulated in an extending portion 19 shown in FIG. 2 was determined by gas chromatography. Results are shown in Tables 2 and 3. In Table 2, the amount of gas in Battery B2 is expressed as a relative value on the basis that the amount of gas in Battery B1 is 100. In Table 3, the amount of gas in Battery B4 is expressed as a relative value on the basis that the amount of gas in Battery B3 is 100.

Charge Prior to Storage

Constant-current charge was performed at a current of 0.5 lt (400 mA) until the voltage of each battery reached 4.2 V. Furthermore, constant-voltage charge was performed at a voltage of 4.2 V until the current reached 0.02 lt (16 mA).

High-Temperature Storage Conditions

At 85° C. for 3 days.

TABLE 2

| Batteries | Amount of mixed silicon-containing material (mass percent) | | Amount of added conductive agent (mass percent) | | Abundance ratio of binding agent A (%) | | Amount of gas |
|---|---|---|---|---|---|---|---|
| | Surface side | Current collector side | Surface side | Current collector side | Surface side | Current collector side | |
| B1 | — | — | — | — | 62 | 38 | 100 |
| B2 | — | — | — | — | 33 | 67 | 85 |

TABLE 3

| Batteries | Amount of mixed silicon-containing material (mass percent) | | Amount of added conductive agent (mass percent) | | Abundance ratio of binding agent A (%) | | Amount of gas |
|---|---|---|---|---|---|---|---|
| | Surface side | Current collector side | Surface side | Current collector side | Surface side | Current collector side | |
| B3 | 4 | 4 | — | — | 57 | 43 | 100 |
| B4 | 4 | 4 | — | — | 35 | 65 | 122 |

As is clear from Table 2, in the case of using a carbon material only as a negative electrode active material, Battery B2, in which a large amount of the binding agent A is placed on the current collector side, has a reduced amount of gas as compared to Battery B1. In contrast, as is clear from Table 3, in the case of using a silicon-containing material as a negative electrode active material, Battery B4, in which a large amount of the binding agent A is placed on the current collector side, has an increased amount of gas as compared to Battery B3. This is a result different from that in the case of using the carbon material only as a negative electrode active material.

In Battery B4, since the amount of the binding agent A on the surface side is small, the negative electrode active material is exposed by significant expansion and contraction during charge and discharge and fresh surfaces are formed in the negative electrode active material by the pulverization of an active material during charge and discharge; hence, a side reaction between the negative electrode active material and an electrolyte solution occurred. Therefore, it is conceivable that Battery B4 has an increased amount of gas as compared to Battery B3. In contrast, in Battery B2, although the amount of the binding agent A on the surface side is small as is the case with Battery B4, the amount of generated gas is not increased but is reduced as compared to that in Battery B1. This shows that the generation of gas by the side reaction is not problematic in the case of using the carbon material as a negative electrode active material.

REFERENCE SIGNS LIST

10 Nonaqueous electrolyte secondary battery
11 Laminate enclosure
12 Wound electrode assembly
13 Positive electrode
14 Negative electrode
14a Negative electrode current collector
14b First negative electrode mixture sub layers
14c Second negative electrode mixture sub layers
15 Separators
16 Positive electrode current-collecting tab
17 Negative electrode current-collecting tab
18 Heat seal portion
19 Extending portion

The invention claimed is:

1. A negative electrode for nonaqueous electrolyte secondary batteries, comprising a negative electrode current collector and a negative electrode mixture layer placed on the negative electrode current collector,
    wherein the negative electrode mixture layer is a layer of a mixture of a negative electrode active material, a binding agent, and a conductive agent; the binding agent includes a binding agent A made of a rubber polymeric compound; and in the case where a through-thickness cross section of the negative electrode mixture layer is halved into a current collector-side region and a surface-side region, the amount of the binding agent A in the current collector-side region and the amount of the conductive agent in the surface-side region are larger than the amount of the binding agent A in the surface-side region and the amount of the conductive agent in the current collector-side region, respectively, and
    wherein each of the current collector-side region and the surface-side region include the negative electrode active material containing a silicon-containing material and carbon; a mass ratio A of the silicon-containing material to the sum of the silicon-containing material and the carbon on the surface side region is larger than a mass ratio B of the silicon-containing material to the sum of the silicon-containing material and the carbon in the collector-side region on the current collector-side region.

2. The negative electrode for nonaqueous electrolyte secondary batteries according to claim 1, wherein the binding agent further includes a binding agent B made of a water-soluble polymeric compound.

3. The negative electrode for nonaqueous electrolyte secondary batteries according to claim 1, wherein the silicon-containing material contains a silicon oxide (where the atomic ratio x of oxygen to the total amount of Si is given by $0.5 \leq x \leq 1.5$).

4. The negative electrode for nonaqueous electrolyte secondary batteries according to claim 3, wherein the silicon oxide is surface-coated with carbon.

5. The negative electrode for nonaqueous electrolyte secondary batteries according to claim 1, wherein the amount of the silicon-containing material contained in the surface-side region is 50% to 100% by mass of the amount of the silicon-containing material contained in the negative electrode mixture layer.

6. The negative electrode for nonaqueous electrolyte secondary batteries according to claim 1, wherein the content of the conductive agent in the negative electrode mixture layer is 0.1% to 20% by mass.

7. The negative electrode for nonaqueous electrolyte secondary batteries according to claim 1, wherein the amount of the binding agent A contained in the current collector-side region is 50% to 70% of the amount of the binding agent A contained in the negative electrode mixture layer.

8. The negative electrode for nonaqueous electrolyte secondary batteries according to claim 1, wherein the mass ratio A is three times or more than the mass ratio B.

9. The negative electrode for nonaqueous electrolyte secondary batteries according to claim 1, wherein the mass ratio A is three times than the mass ratio B.

* * * * *